United States Patent [19]

Kohzai et al.

[11] Patent Number: 4,501,999
[45] Date of Patent: Feb. 26, 1985

[54] SYSTEM FOR STOPPING SPINDLE AT COMMANDED POSITION

[75] Inventors: Yoshinori Kohzai, Hino; Yoshiki Fujioka, Higashiyamato; Naoto Ota, Hino, all of Japan

[73] Assignee: Fanuc Ltd, Minamitsuru, Japan

[21] Appl. No.: 403,641

[22] PCT Filed: Nov. 18, 1981

[86] PCT No.: PCT/JP81/00341

§ 371 Date: Jul. 27, 1982

§ 102(e) Date: Jul. 27, 1982

[87] PCT Pub. No.: WO82/01841

PCT Pub. Date: Jun. 10, 1982

[30] Foreign Application Priority Data

Dec. 4, 1980 [JP] Japan ................. 55-171157

[51] Int. Cl.³ ........................... G05D 23/275
[52] U.S. Cl. .................... 318/632; 318/572; 74/825
[58] Field of Search .......... 318/632, 572, 571, 594; 74/825

[56] References Cited

U.S. PATENT DOCUMENTS

| | | | |
|---|---|---|---|
| 3,449,554 | 6/1969 | Kelling | 318/572 |
| 3,605,531 | 9/1971 | Izumi et al. | 318/572 X |
| 3,672,246 | 6/1972 | Prewett et al. | 318/632 X |
| 4,038,591 | 7/1977 | Harman | 318/632 X |
| 4,214,191 | 7/1980 | Watanabe et al. | 318/572 X |
| 4,403,179 | 9/1983 | Kohzai et al. | 318/632 |
| 4,404,506 | 9/1983 | Nishimura et al. | 318/572 X |

OTHER PUBLICATIONS

JP,B1, 49-47355 (Carney and Tracker Corp.), Dec. 14, 1974, (14.12.74) & USA, 3,483,767.

*Primary Examiner*—B. Dobeck
*Attorney, Agent, or Firm*—Staas & Halsey

[57] ABSTRACT

During operation of a machine tool, a motor 14 driving a spindle 17 holding a tool 18 is operated at a commanded speed by a speed control system in accordance with a speed command signal VCMD with the feedback of an actual speed signal TSA. As a stopping command ORCM is issued for stopping the spindle, the spindle is decelerated to a predetermined speed in response to a reference signal output from a constant voltage generating circuit 33. After the deceleration of the spindle to the predetermined speed, as the rotational position of the spindle comes into a region within 180° from a predetermined position, a position offset signal PS', which smoothly crosses the zero level at the position at which the spindle is to be stopped, and which is generated from two signals $e_1$ and $e_2$ from a resolver connected to the spindle. Then, the operation mode is switched to a position control system in which the position offset signal is used as the reference signal for stopping the spindle at the commanded position.

6 Claims, 5 Drawing Figures

Fig. 4
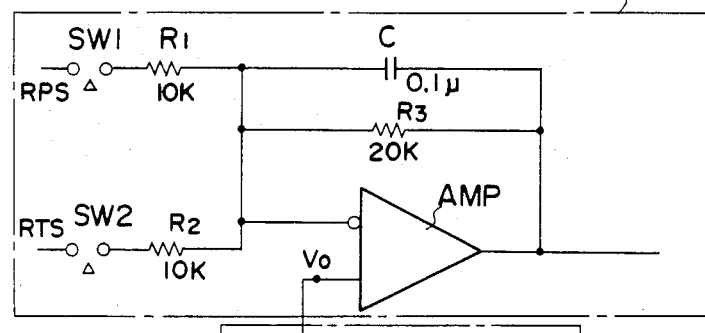
WAVEFORM COMPOSITION CIRCUIT 27
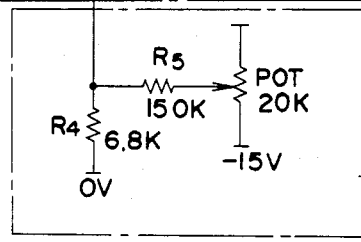
28 STOP POSITION ADJUSTING CIRCUIT
Fig. 5
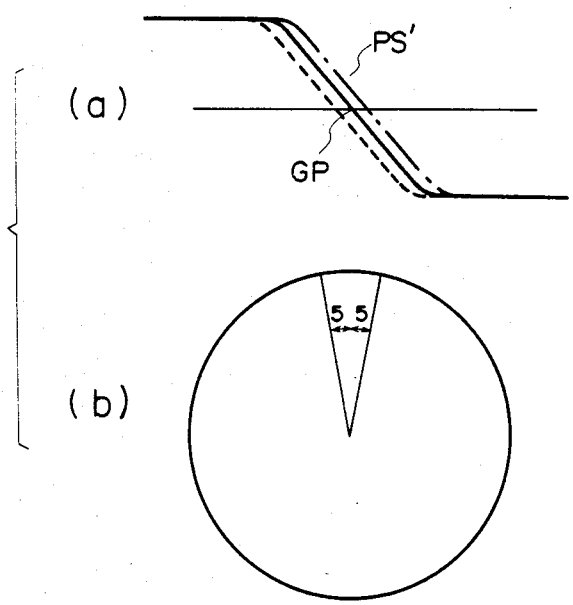

SYSTEM FOR STOPPING SPINDLE AT COMMANDED POSITION

BACKGROUND OF THE INVENTION

The present invention broadly relates to a spindle control system for use in a machine tool which automatically performs mechanical machining while making automatic exchange of tools and, more particularly, to a system incorporating a resolver and adapted to stop the spindle of the machine tool at a commanded position. Still more particularly, the invention is concerned with a system for stopping a spindle at a commanded position, improved to permit an adjustment of the stopping position.

Such machine tools are known as having automatic tool exchanging functions and are capable of automatically performing mechanical machining through automatic exchange of tools. In this type of machine tool, it is essential that the spindle be stopped precisely at a commanded position, in order that the mating portions of the spindle and the tool can smoothly engage with each other. The stopping of the spindle at the commanded position is necessary also in boring, because the boring tool cannot be correctly inserted into a bore formed in the workpiece unless the spindle is stationed precisely at the commanded position. Thus, in the field of mechanical work, there is a great demand for in the art for stopping the spindle of a machine tool precisely at a commanded position. Hitherto, a mechanical braking mechanism and a pin mechanism in combination have been used for stopping the spindle at the commanded position. This mechanical system, however, often failed to stop the spindle at the commanded position partly because of frequent breakage of the pin mechanism (stopping mechanism) due to the application of an abnormal external force or the occurrence of an extraordinary state in the machine tool and partly because of rapid wear of the braking mechanism due to friction. As a consequence, conventional machine tools often failed to perform the automatic exchange of tools and the insertion of the boring tool. In order to avoid such a failure, it has been necessary to undertake a frequent inspection of the machine tool or a renewal of worn parts.

SUMMARY OF THE INVENTION

Accordingly, it is an object of the invention to provide a spindle stopping system capable of stopping a spindle at a commanded position with a high precision purely electrically, i.e. by means of a resolver.

The invention also has an object of providing a system for stopping a spindle at a commanded position, improved to permit a fine adjustment of the stopping position within a range of about ±5°.

According to the invention, the spindle of a machine tool carrying and driving various tools is driven at a commanded speed under the control of a speed control system. Then, as a spindle stopping command is given for stopping the spindle at a commanded position, the control is switched from the speed control system to a position control system to decelerate the spindle from a normal machining speed to a predetermined low speed. As the spindle is decelerated to the predetermined low speed, an output obtained through synchronous rectification of one of the output voltages from the primary coil of a resolver and an output obtained by converting the other output voltage of the primary coil into a rect-angular wave are combined with each other to form a positiom offset signal which smoothly crosses the zero level when the spindle rotates across the commanded stop position. This position offset signal is used as the reference signal in the position control system to make the spindle gradually approach the commanded position. Then, as the spindle comes into a predetermined rotational region for stopping, an in-position signal is produced and, after confirming that the spindle is correctly stopped at the commanded position, an orientation completion signal is produced to start the next step for tool exchange. According to the invention, therefore, it is possible to maintain the correct positional relationship between the tool on the spindle and the workpiece to permit a smooth and safe exchange of tools.

According to another aspect of the invention, means is provided for finely adjusting the lattice point at which the zero level is crossed by the composite output of the resolver within a range of about ±5°, in order to permit compensation for error which may be involved in the mounting of the resolver on the spindle.

BRIEF DESCRIPTION OF THE DRAWINGS

FIG. 4 is a circuit diagram of a position adjusting circuit; and

FIG. 5 is an illustration of position adjustment.

DESCRIPTION OF THE PREFERRED EMBODIMENT

Figure 1:
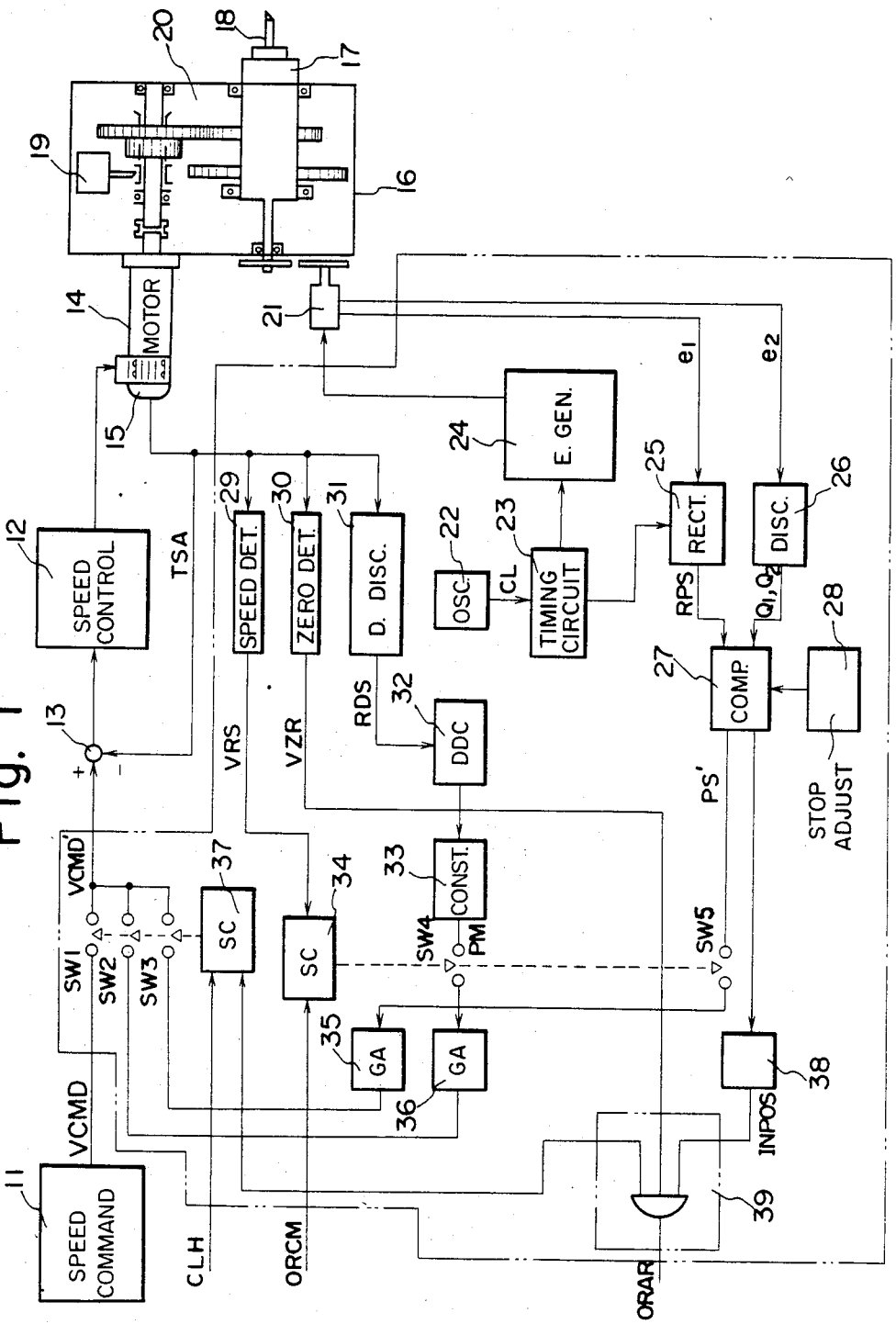
FIG. 1 is a block diagram of an embodiment of the invention.

The invention will be fully described hereafter with reference to the accompanying drawings. Referring first to FIG. 1, a speed command circuit 11 incorporated in a numerical controller NC produces a speed command $V_{CMD}$. A speed control circuit 12 includes a phase compensation circuit, voltage/phase converter and a thyristor circuit (not shown). An adder/subtracter circuit 13 is adapted to produce, in the speed control mode of operation, an output voltage signal (speed offset) corresponding to the difference between the commanded speed $V_{CMD}$ and actual speed TSA and, in the stop position control mode of operation, a difference voltage signal corresponding to a later-mentioned position offset and the actual speed TSA. A tachogenerator 15 is adapted to produce an actual speed voltage signal TSA corresponding to the speed of a D.C. motor 14. Reference numerals 16, 17 and 18 denote a gear box, spindle and a tool, respecively. A clutch 19 housed by the gear box 16 is operated when a speed changing gear 20 between the D.C. motor 14 and the spindle 17 is switched between a "Low" mode and a "High" mode.

A resolver 21 has primary coils arranged to cross each other at a right angle and a secondary coil wound on a rotor. The secondary coil receives an exciting signal which is generated by a later-mentioned resolver exciting signal generator. The secondary coil generates, in accordance with the offset of the rotor, offset signals $e_1$ and $e_2$ having a phase differential $\pi/2$.

Representing the exciting signal and the offset angle by $A.\sin wt$ and $\theta$, respectively, these offset signals $e_1$ and $e_2$ can be expressed as follows.

$$e_1 = A \cdot \sin \theta \cdot \sin \omega t \quad (1)$$

$$e_2 = A \cdot \cos \theta \cdot \cos \omega t \quad (2)$$

Reference numerals 22 and 23 denote a clock oscillator and a timing circuit, respectively. The aforementioned resolver exciting signal generator is designated as reference numeral 24. Numerals 25, 26, 27 and 28 are used to denote, respectively, a synchronous rectifier, a quadrant discrimination circuit, a waveform composition circuit and a stop position adjusting circuit.

Figure 2:
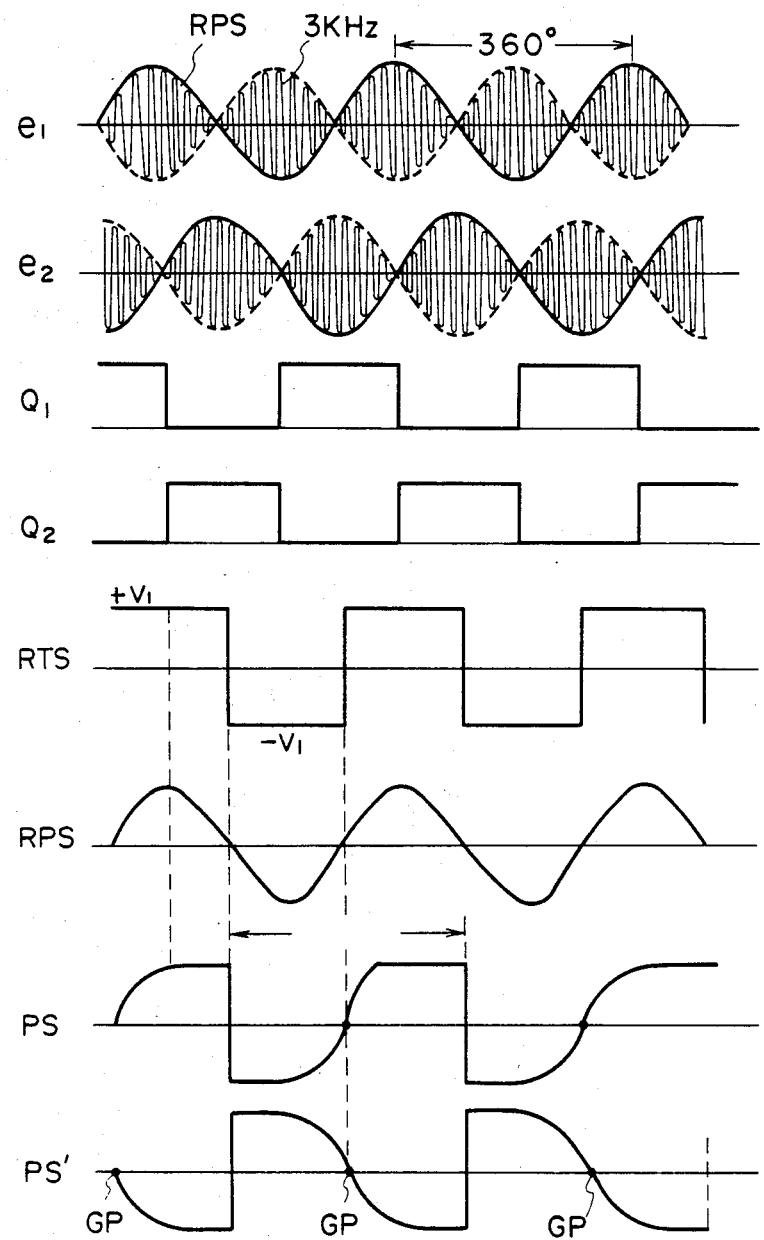
FIGS. 2 and 3 are waveform charts showing waveforms of signals available at various parts in the embodiment shown in FIG. 1.

The clock oscillator 22 continuously produces a clock signal CL in the form of rectangular pulses at an oscillation frequency of 3 kHz. This clock signal is fed to the resolver exciting signal generator 24 through the timing circuit 23. The resolver exciting signal generator 24 produces a resolver exciting signal of 3 kHz and delivers the same to the secondary coil of the resolver 21. As the secondary coil receives the resolver exciting signal of 3 kHz in the form of a sine wave, the primary coils produce the signals $e_1$ and $e_2$ determined by the formulae (1) and (2) above. More specifically, the signal $e_1$ is a sine-wave signal of 3 kHz having an amplitude which changes in proportion to the sine of the angle $\theta$ of rotation of the rotor of the resolver 21, while the signal $e_2$ is a cosine-curve signal of 3 kHz having an amplitude which changes in proportion to the cosine of the rotation angle $\theta$, as will be seen from FIG. 2. The sine-wave signal $e_1$ is delivered to the synchronous rectifier circuit 25 which makes a synchronous rectification of the sine-wave signal by means of the 3 kHz clock signal delivered through the timing circuit 23, thereby to produce a rotational position signal RPS (thick solid line curve in $e_1$ in FIG. 2) which changes in the form of a sine curve in accordance with the rotation of the spindle 17. The signal RPS is delivered to a waveform combining circuit 27. Meanwhile, the cosine-wave signal $e_2$ is fed to the quadrant discrimination circuit 26 which then effects synchronous rectification of the signal $e_2$ to produce a signal which changes in the form of a cosine-wave in accordance with the rotation of the spindle 17 as shown by thick solid line in $e_2$ in FIG. 2. This cosine-wave signal is then converted into two quadrant discrimination signals $Q_1$ and $Q_2$ having rectangular waveforms and having a 180° phase differential from each other. Upon receipt of the rotational position signal RPS and the quadrant discrimination signals $Q_1$ and $Q_2'$ the waveform composition circuit 27 produces therein a rectangular signal RTS of an amplitude $V_1$ and combines this rectangular signal RTS and the rotational position signal RPS (amplitude $V_1$) to produce a position signal PS or PS'. The point at which the zero level is crossed by the position signal PS' is generally referred to as a "lattice point" GP. The position signal PS' smoothly crosses the lattice point each time the spindle 17 makes one full rotation, from the positive side to the negative side or vice versa in accordance with the direction of rotation of the spindle 17. The spindle is stopped at this lattice position, i.e. at the position where the position signal PS' is zero. The lattice point is adjustable by means of the stop position adjusting circuit 28. Namely, the waveform composition circuit AMP 27 incorporates an amplifier circuit (See FIG. 4) for amplifying the position signal PS'. The amplifier circuit has an amplifier AMP the offset voltage of which is adjustable by a potentiometer POT incorporated in the position adjusting circuit 28. Namely, the position signal PS' is shifted to the left and right to shift the stopping position as the offset voltage $V_o$ is controlled by adjustment of the potentiometer POT as will be seen from FIG. 5.

A speed detection circuit 29 is adapted to produce a speed signal VRS when the rotation speed of the DC motor has reached a predetermined speed, i.e. when the output from the tachogenerator has reached a predetermined level. A zero-speed detector 30 produces a speed zero signal when the output of the tachogenerator becomes zero. A rotation direction discriminator 31 is adapted to check whether the output voltage from the tachogenerator 15 is positive or negative and to produce a rotation direction signal RDS which takes a "1" level and a "0" level in response to forward rotation and backward rotation, respectively. A reference numeral 32 denotes a direction changing circuit (DDC) while 33 designates a constant voltage generating circuit (const.). The constant voltage generating circuit 33 produces a constant voltage of $+V_i$ (volts) when the forwardly rotating spindle is to be stopped and a constant voltage $-V_i$ (volt) when the spindle to be stopped is rotating backwardly. A switch change-over circuit (SC) 34 is adapted to turn switches SW4 and SW5 on and off, respectively, when it receives a spindle stopping command ORCM from a spindle stopping command means (not shown). When the speed of the D.C. motor reaches the predetermined level, i.e. when the speed signal VRS takes the level "1", the switch change-over circuit turns the switches SW4 and SW5 off and on, respectively. A gain adjusting circuit (GA) 35 is adapted to increase the gain of the position control loop when the low gear is used, i.e. when the speed reduction ratio is high, while another gain adjusting circuit 36 has a function to decrease the gain of the position control loop when the high gear is used, i.e. when the speed reduction ratio is low. A switch change-over circuit (SC) 37 is adapted to turn a switch SW2 on while turning off switches SW1 and SW3, when the spindle stopping command ORCM is logical "1", i.e., "ON" (closed) while the low gear is in use, that is, while the signal CLH is at the level "1". However, when the spindle stopping command ORCM takes the "1" level while the high gear is in use, i.e., while the signal CLH is at the "0" level, the switch change-over circuit 37 turns the switch SW3 on while turning the switches SW1 and SW2 off. When the spindle stopping command ORCM takes the "0" level, i.e. when it is in the OFF state (open), the switch SW1 is turned on while the switches SW2 and SW3 are turned off. A reference numeral 38 designates an in-position signal generator composed of a comparator. The in-position signal generator 38 monitors the position signal PS' and produces an in-position signal INPOS when the spindle has come into a predetermined rotational region around the commanded position. An orientation completion signal generating circuit 39 produces an orientation completion signal ORAR when the spindle rotation speed becomes zero (VZR="1") followed by the changing of the in-position signal INPOS to the "1" level, on condition that the spindle stopping command ORCM takes the "1" level.

The system of the invention having the described construction operates in a manner explained hereafter.

When the spindle is rotating for the cutting of a workpiece or other purpose, the switch SW1 is held in an on state while the switches SW2 and SW3 are in off state to complete the speed control loop. Namely, the subtracter circuit 13 receives the speed command VCMD from the speed command circuit 11 and the actual speed TSA from the tachogenerator 15, and produces a speed offset voltage signal. The speed control circuit 12 controls the firing angle of a thyristor (not shown), in accordance with the speed offset voltage signal, thereby to increase or decrease the voltage impressed on the D.C. motor 14. In consequence, the actual speed TSA of the D.C. motor 14 is increased or decreased to the level of the speed command VCMD. Thus, the speed control is effected to nullify the speed offset, so that the spindle is driven at the commanded speed.

Figure 3:
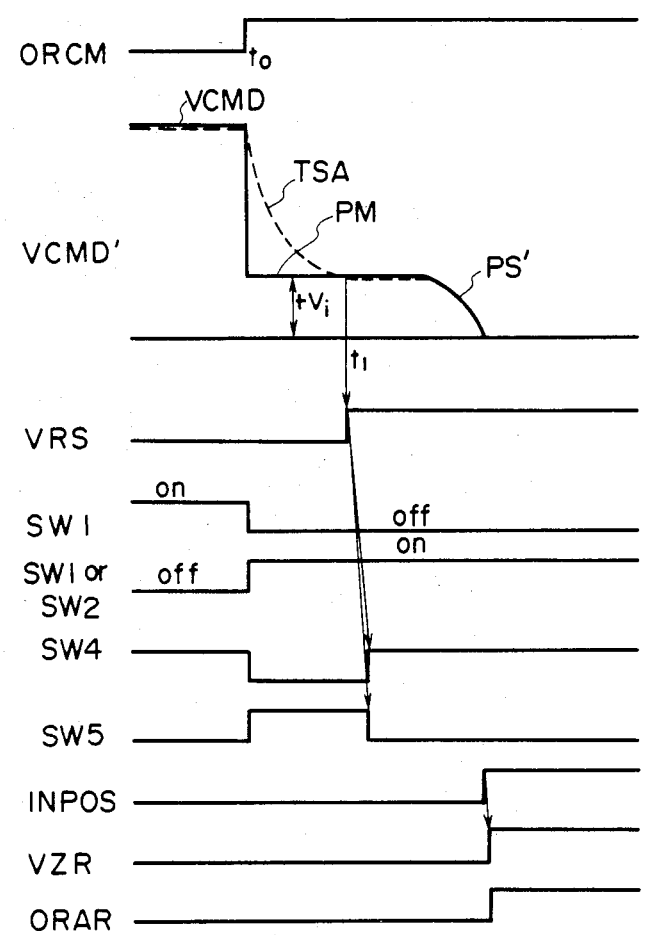

Then, as the cutting of the work by the machine tool is finished, the spindle stopping command ORCM is issued by the spindle stopping command means (not shown) at a moment $t_0$ (See FIG. 3). Upon receipt of the spindle stopping command, the switch change-over circuit 37 turns on one of the switches SW2 and SW3 while turning off the switch SW1, depending on the state of the gear 20, i.e. depending on whether the signal CLH takes the level "1" or "0", thereby to complete a position control loop. Once this loop is formed, the constant voltage generated by the constant voltage generating circuit 33 is delivered to the adder/subtracter circuit 13 through the switch SW4, either one of the gain adjusting circuits 35 and 36 and either one of the switches SW2 and SW3. As a consequence, the actual spindle speed is decreased following the broken line curve in FIG. 3 and is lowered to the predetermined speed at a moment $t_1$. Meanwhile, the rotational direction detection circuit 31 is monitoring whether the actual speed voltage TSA is positive or negative, and produces a rotational direction signal RDS which takes the level "1" (forward rotation) when the actual speed voltage is positive and the level "0" (backward rotation) when the same in negative. For instance, assuming here that the spindle is rotating forwardly during cutting, the rotational direction signal RDS takes the level "1" so that the constant voltage generating circuit 33 produces a constant positive voltage (+Vi). The level of the constant positive voltage Vi is equal to the maximum amplitude of the position signal PS'.

When the spindle is decelerated to the predetermined speed, the speed detection circuit 29 produces the speed signal VRS of "1" level. As a detection means (not shown) detects that the spindle has a rotational position which is within 180° of the commanded position after the level of the speed signal VRS is changed to "1", the switch change-over circuit 34 turns the switch SW4 off while turning the switch SW5 on. The output voltage +Vi from the constant voltage generating circuit 33 applied to the adder/subtracter circuit 13 is replaced by the position signal PS' (See FIG. 2) coming from the waveform composition circuit 27. Namely, the position signal PS' is delivered to the adder/subtracter circuit 13 through the switch SW5, either one of the gain adjusting circuits 35 and 36 and either one of the switches SW2 and SW3. The adder/subtracter circuit 13 then effects a position control to nullify the difference between the position signal PS' and the actual speed TSA. As the rotational position of the spindle becomes sufficiently close to the commanded position, the in-position signal generating circuit 38 produces an in-position signal INPOS. Thereafter, as the spindle speed becomes zero, the orientation completion signal generating circuit 39 produces an orientation completion signal ORAR.

As has been described, according to the invention, a resolver 21 is used as the position detector and the output of the resolver is utilized effectively in such a manner that the position offset signal crosses the zero level smoothly (at an acute angle) to permit the stopping of the spindle precisely at the commanded position.

It is, however, difficult to correctly attach the resolver 21 to the spindle 17 in such a manner that the position signal PS' crosses the zero level at the designated position. This gives rise to a demand for fine adjustment to make the position signal PS' cross the zero volt level at the correct position, after attaching the resolver to the spindle. This can be accomplished by shifting the lattice point GP of the position signal PS' to the left and right as shown in FIG. 5(a) by adjusting the potentiometer POT (See FIG. 4) of the stopping position adjusting circuit 28. By so doing, it is possible to adjust the commanded spindle stopping position within a region of rotational angle of about +5° and, hence, to make the position signal PS' cross the zero level at the commanded position.

It is preferred that the length of time required for orientation be substantially constant regardless of the state of the speed reduction gears, i.e. independently of whether the low gear is used or the high gear, and that the system be stabilized. To this end, according to the invention, the gain of the position control loop is so controlled that a high gain is obtained when the low gear is used while a low gain is obtained when the high gear is used, by the selective use of the gain adjusting circuits 35 and 36 and the switches SW2 and SW3 in combination with the switch change-over circuit 37. By changing the gain in accordance with the state of the gear (speed reduction ratio), it is possible to eliminate any hunting or overshoot in the stopping of the spindle and to make the time length required for the stopping of the spindle substantially constant regardless of the speed reduction ratio.

To shorten the length of time for stopping the spindle at the commanded position, it is preferred that control for stopping the spindle at the commanded position be performed not only when the spindle is rotating forwardly but also when the spindle is rotating backwardly. To cope with this demand, the system of the invention incorporates the rotational direction detection circuit 31 and the constant voltage generating circuit 33 which produces a constant positive voltage +Vi and a constant negative voltage −Vi when the spindle is rotating forwardly and backwardly, respectively, and control is effected such that the level of the position signal PS' approaches from the positive level +Vi to the zero level when the spindle is rotating forwardly and from the negative level −Vi to the zero level when the spindle is rotating backwardly.

As has been described, a novel spindle stopping system incorporating a resolver is provided by the present invention. Since the commanded spindle stopping position can be simply adjusted within a region of about ±5° even after mounting the resolver on the spindle, it is possible to stop the spindle at the commanded position with a high degree of accuracy, even if there is an unavoidable error in the mounting of the resolver. In addition, since the gain of the position control loop can be changed over in accordance with the state of the speed reduction gear, it is possible to stabilize the system and to make the length required for stopping substantially constant, regardless of the state of the speed reduction gear. Furthermore, since control for stopping the spindle at the commanded position can be made not only when the spindle is rotating forwardly but also when the spindle is rotating backwardly, it is possible to shorten the length of time required for stopping the spindle at the commanded position. This system, therefore, can be used suitably in a machine tool having an automatic tool exchanging function for performing mechanical machining while automatically exchanging tools.

What is claimed is:

1. A system for stopping a spindle at a commanded position operating at a commanded speed, comprising:
    an electric motor;
    a speed detector, operatively connected to said electric motor, for detecting a speed of rotation of said electric motor and for producing an actual speed signal;
    a speed control circuit, operatively connected to said speed detector and to receive the commanded speed, for effecting control to nullify the offset of the actual speed from the commanded speed;
    a spindle operatively connected to and driven by said electric motor; and
    a position control circuit, operatively connected to said spindle and said speed control circuit, for generating a position offset signal corresponding to an offset of a position of a predetermined portion of said spindle from the commanded position at which said portion of said spindle is to be stopped, the rotation of said spindle being controlled by said speed control circuit to maintain said commanded speed and by said position commanded to nullify said position offset signal, said position control circuit comprising:
        a resolver, operatively connected to said spindle, having a secondary coil and having two primary coils producing output voltages;
        a resolver exciting signal generator, operatively connected to said resolver, for supplying an exciting signal to the secondary coil of said resolver;
        a synchronous rectifier circuit, operatively connected to one of the primary coils of said resolver, for providing synchronous rectification of the output voltage from said one of said primary coils;
        a quadrant discrimination circuit, operatively connected to the other of said primary coils, for converting the output voltage from said other of said primary coils into rectangular waves;
        a waveform combining circuit, operatively connected to said synchronous rectifier circuit and said quandrant discrimination circuit, for combining the output voltage of said synchronous rectifier circuit and the output voltage from said quadrant discrimination circuit to produce said position offset signal which smoothly crosses a zero level at the commanded position at which said spindle is to be stopped; and
        a stopping position adjusting circuit, operatively connected to said waveform combining circuit, for adjusting a position of a lattice point at which said position offset signal crosses the zero level.

2. A system for stopping a spindle at a commanded position according to claim 1, wherein a gain of the position control system is switched in accordance with a low or high state of a gear positioned between said motor and said spindle.

3. A system for stopping a spindle at a commanded position according to claim 2, further including a circuit, operatively connected to said speed control circuit, for stopping said spindle from a present direction of rotation of said spindle.

4. A system for stopping a spindle, operatively connectable to receive a commanded position signal, comprising:
    positioning means, operatively connected to the spindle and operatively connectable to receive the commanded position signal, for positioning the spindle; and
    adjustable offset means, operatively connected to said positioning means, for generating an adjustable offset position signal allowing the stopping position of the spindle to be adjusted in both the forward and backward rotational directions, said positioning means positioning the spindle at a commanded position in dependence upon the adjustable offset position signal and the commanded position signal.

5. A system for stopping a spindle according to claim 4, wherein said adjustable offset means comprises:
    excitation means for generating an excitation signal;
    a resolver, operatively connected to said excitation means and the spindle, for generating spindle position signals in dependence upon the spindle position by modifying the excitation signal;
    a rectifier circuit, operatively connected to said excitation means and said resolver, for generating a rotational position signal in dependence upon one of the spindle position signals;
    a quadrant discrimination circuit, operatively connected to said resolver, for generating quadrant signals in dependence upon another one of said spindle position signals;
    a stop position adjustment circuit for generating an adjustable offset signal; and
    a combining circuit, operatively connected to said positioning means, said rectifier circuit, said quadrant discrimination circuit and said stop position adjustment circuit, for combining the rotational position signal, the quadrant signals and the offset signal to produce the adjustable offset position signal.

6. A system for stopping a spindle according to claim 5, wherein said excitation means comprises:
    an oscillator;
    a timing circuit operatively connected to said oscillator and said rectifier circuit; and
    an excitation signal generator operatively connected to said timing circuit and said resolver.

* * * * *

UNITED STATES PATENT AND TRADEMARK OFFICE
CERTIFICATE OF CORRECTION

PATENT NO. : 4,501,999

DATED : February 26, 1985

INVENTOR(S) : KOHZAI ET AL.

It is certified that error appears in the above-identified patent and that said Letters Patent is hereby corrected as shown below:

Col. 1, line 28, delete "for".

Col. 3, line 62, delete "AMP";
line 63, after "circuit" insert --AMP--.

Col. 4, line 16, "(const.) should be --(Const.).

Col. 5, line 33, "in" should be --is--.

Col. 6, line 21, "is used or the high gear" should be --or the high gear is used--.

Signed and Sealed this

Third Day of September 1985

[SEAL]

Attest:

DONALD J. QUIGG

*Attesting Officer*    Acting Commissioner of Patents and Trademarks - Designate